United States Patent
Byon

[11] Patent Number: 5,842,718
[45] Date of Patent: Dec. 1, 1998

[54] AIR BAG SYSTEM FOR A MOTOR VEHICLE

[75] Inventor: Sung-Kwang Byon, Seoul, Rep. of Korea

[73] Assignee: Daewoo Electronics Co., Ltd., Seoul, Rep. of Korea

[21] Appl. No.: 892,105

[22] Filed: Jul. 14, 1997

Related U.S. Application Data

[63] Continuation-in-part of Ser. No. 579,197, Dec. 27, 1995, abandoned.

[30] Foreign Application Priority Data

Mar. 22, 1995 [KR] Rep. of Korea .................... 95-6061

[51] Int. Cl.$^6$ .................................................. B60R 21/26
[52] U.S. Cl. ...................... 280/736; 280/728.1; 280/735; 280/741
[58] Field of Search ................................ 280/728.1, 735, 280/736, 741

[56] References Cited

U.S. PATENT DOCUMENTS 5,184,846  2/1993  Goetz ...................................... 280/736
5,219,178  6/1993  Kobari et al. ........................... 280/736

*Primary Examiner*—Paul N. Dickson
*Attorney, Agent, or Firm*—Beveridge, DeGrandi, Weilacher & Young LLP

[57] ABSTRACT

An improved air bag system requires low manufacturing cost and facilitates an installation thereof. A flexible hose is installed between an air bag and an inflator for preliminarily charging air into the air bag, an air pipe is provided for connecting the flexible hose to an inlet manifold of a motor vehicle, a pressure sensor is installed within the flexible hose, and a cut off valve is within the air pipe. A compressor and an air reservoir are provided between flexible hose and the inlet manifold for supplying the air to the air bag through flexible hose and the air pipe. The inflator has a single filter in place of a cooling passage. A collision sensor, an electronic control unit and the inflator constitute a single module except the air bag to easily mount the air bag system to the motor vehicle. Thus, the quantities of a pyrotechnic material and a gas generating material required for inflating the air bag are reduced and the air bag of various sizes is employed while affording a cooling effect to an inflation gas of high temperature and high pressure.

18 Claims, 2 Drawing Sheets

AIR BAG SYSTEM FOR A MOTOR VEHICLE

CROSS REFERENCE TO RELATED APPLICATIONS

This application is a continuation-in-part of application Ser. No. 08/579,197 filed Dec. 27, 1995, now abandoned.

BACKGROUND OF THE INVENTION

1. Field of the Invention

The present invention relates to an improved air bag system for a motor vehicle, and more particularly to an air bag system for a motor vehicle capable of preliminarily charging air under an atmosphere pressure into an air bag of the motor vehicle.

2. Description of the Prior Art

An air bag system of a variety of types for motor vehicles have been proposed hitherto. A conventional air bag system for a motor vehicle generally includes an inflatable air bag, a collision sensor for sensing the collision of the motor vehicle to generate a collision sensing signal. Also, the conventional air bag system includes an electronic control unit (hereinafter referred to as "ECU") for receiving the collision sensing signal from the collision sensor to control the operation of the air bag, and an inflator for injecting a gas or air into the inflatable air bag in accordance with an air bag expansion triggering signal from the ECU to expand the air bag.

An operation of the conventional air bag system constructed as above will be considered with reference to FIG. 3. If a shock is applied to a cat body by the collision with another vehicle or object during the running of the vehicle along a road, the collision of the vehicle is monitored by a collision sensor 40 mounted to the forefront of the vehicle. Colllision sensor 40 generates the collision sensing signal to supply it to an ECU 30 when the shock against the car body exceeds a preset shock value required for inflating an air bag 10. ECU 30 determine whether the collision sensing signal is received from collision sensor 40 or not to provide the air bag expansion triggering signal to an inflator 20. Once the air bag expansion triggering signal is provided, inflator 20 injects an inert gas such as nitrogen $N_2$ or argon Ar, or the air to inflatable air bag 10 to instantaneously inflate air bag 10. Consequently, by the inflated air bag 10, the passenger in the vehicle can be protected from colliding with a structural part of the vehicle.

In the conventional air bag system operated as above, since an inflation gas of high temperature and high pressure produced by the explosive combustion of a pyrotechnic material and a gas generating material being an ignitable material included in the inflator is instantaneously supplied into the folded air bag to inflate the air bag, large quantities of pyrotechnic material and gas generating material are required for a perfect expansion of the air bag. Besides, after expanding the air bag, the inflation force of the air bag is degraded resulting from the pressure decrease of the inflation gas.

On the other hand, FIG. 4 illustrates inflator 20 which has been heretofore employed in the conventional air bag system described as above. Inflator 20 includes a cylindrical container 60 for defining a chamber 50 in which a squib 22, a pyrotechnic material 24 and a gas generating material 26 being an ignitable material are placed. In addition, a metal filter 70 and a ceramic filter 80 are disposed within chamber 50. Here, Metal filter 70 and ceramic filter 80 are provided for eliminating specific materials as minute particles or molten materials from combustion products originated from the combustion of pyrotechnic material 24 and gas generating material 26. The reason of eliminating the specific materials as minute particles or molten materials by employing metal filter 70 or ceramic filter 80 is in that the materials are discharged from air bag 10 to the interior of the vehicle after expanding air bag 10 to be apt to contaminate the air within the vehicle.

A tortuous gas flow passage 90 is formed within chamber 50, which typically performs two functions: first, identical to the aforesaid filters, it eliminates the specific materials of the minute particles and molten materials from the combustion products originated during the combustion of pyrotechnic material 24 and gas generating material 26. Second, when operating air bag 10, tortuous gas flow passage 90 cools the inflation gas of high temperature and high pressure generated by the explosive combustion of pyrotechnic material 24 and gas generating material 26. The reason of cooling the inflatable gas is in that the inflation gas of high temperature and high pressure may burn a driver or a passenger who contacts air bag 10 in the moment of inflating air bag 10, and, further, the high pressure may apply a secondary shock to the driver or passenger. Thus, above-mentioned tortuous gas flow passage 90 is formed within inflator 20 to prevent the above concerns, so that the temperature of the inflation gas is lowered while, additionally, the pressure of the inflation gas is lowered.

As described above, however, since the plurality of filters are furnished within inflator 20 for eliminating the specific materials as the minute particles and molten materials from the combustion products originated from the combustion of pyrotechnic material 24 and gas generating material 26, and complicated gas flow passage 90 is formed within inflator 20 for cooling the inflation gas of high temperature and high pressure. Due to this construction, the internal structure of inflator 20 becomes considerably complicated, which in turn raises cost of manufacturing inflator 20.

As a conventional technique for solving the problems, U.S. Pat. No. 5,184,846 issued to George W. Goetz et al. in the date of Feb. 9, 1993 can be given as an example. Here, a cylindrical out manifold is installed within an inflator in place of the fibers and gas flow passage typically provided in the inflator. In addition, combustion products are led along a spiral passage within a chamber to eliminate specific materials as minute particles and molten materials from the gaseous combustion products while the gas injected to an air bag is heated by the combustion products within the chamber.

However, George W. Goetz's inflator is equipped with the complicated cylindrical out manifold therein. Accordingly, the inflator is complicated in the construction thereof and is unfavorable in considering the manufacturing cost while failing in affording a distinctive effects with respect to the cooling of the inflation gas of high temperature.

Meantime, the air bag installed to a front passenger seat beside a driver's seat in the motor vehicle should have a capacity larger than the air box implemented to the driver's seat by approximately 2.5 times since the physical features of the passenger occupying the front passenger seat is more variable than the driver occupying the driver's seat. In other words, the passenger occupying the front passenger seat just beside the driver's seat differs from a child to an adult and probably takes a relatively unstable posture as compared with the driver. Therefore, in order to safely protect the passenger on the front passenger seat from an accident such as collision, the air bag mounted to the passenger's compartment necessarily has a capacity greater than that of the air bag mounted to the driver's compartment. As the result, the air bag having a capacity greater than that of the air bag for the driver's compartment has been typically mounted to the passenger's front compartment. At this time, for supplying a gas having a larger volume into the air bag of the relatively great capacity to obtain a desired inflating force, it is a requisite to employ an inflator devised to be able to generate a gas of a great volume.

As the conventional inflator devised to generate the gas having a greater volume, U.S. Pat. No. 5,219,178 issued to Hirokazu Kobari in the date of Jun. 15, 1993 may be given as an example. The above patent discloses an air bag inflation gas generator which includes a substantially circular cylinder formed with a gas exhaust in the middle portion thereof. Two combustion chambers formed by separating members are provided to both ends of the circular cylinder. In addition, a cylindrical end filter is installed coaxially with the circular cylinder within the center of the circular cylinder, middle filters are installed between the separating members and an end filter, and orifices directing the middle filters are formed. An object of the inflation gas generator constructed as above is for generating a combustion gas having a greater volume and for increasing a combustion surface area of gas generating materials to thereby adjust the expansion of the air bag in the optimum state.

The Hirokazu Kobari's generator can supply the combustion gas of the larger volume, but two combustion chambers and the plurality of filters are employed for generating the combustion gas of the larger volume. Consequently, the inflation gas generator is disadvantageous in that large quantities of pyrotechnic material and gas generating material are required, the construction is complicated and a lot of manufacturing cost is needed. Furthermore, a unique solution capable of cooling the combustion gas of high temperature and high pressure is not suggested.

On the other hand, the foregoing conventional air bag systems utilize the air bag and the inflator as a single module with the consequence of making it difficult in changing an implementing of the air bag desired to strive for a safer protection of the passengers within the motor vehicle against the accident.

SUMMARY OF THE INVENTION

The present invention is contrived to solve the foregoing problems. It is an object of the present invention to provide an improved air bag system, in which a quantity of a pyrotechnic material and that of a gas generating material required for inflating an air bag are significantly reduced, and air bag of various sizes can be employed while a cooling effect with respect to the inflation gas of high temperature and high pressure is afforded and the air bag can be easily mounted to a motor vehicle.

In order to achieve the above object, the present invention provides an air bag system for a motor vehicle, the air bag system comprising:

an inflatable air bag;

a collision sensor for sensing a collision of the motor vehicle to generate a collision sensing signal;

an electronic control unit for receiving the collision sensing signal from the collision sensor to control an operation of the inflatable air bag, and for generating an air bag expansion triggering signal when it is judged that the collision is dangerous by receiving the collision sensing signal;

an inflator for injecting an inflation gas into the inflatable air bag in accordance with the air bag expansion triggering signal from the electronic control unit to expand the inflatable air bag;

a first conduit for preliminarily charging an air into the inflatable air bag, the first conduit being connected between the inflatable air bag and the inflator;

a second conduit for introducing the air into the first conduit, the second conduit being connected to the first conduit;

an air supplying means for supplying air to the first conduit through the second conduit, the air supplying means being provided between the second conduit and an inlet manifold of the motor vehicle, the air being supplied from the inlet manifold; and a first valve provided to the second conduit for adjusting an amount of the air admitted into the inflatable air bag and the first conduit in accordance with a control signal from the electronic control unit.

A second valve may be provided for discharging the air in the inflatable air bag when an engine of the motor vehicle is stopped. The air supplying means may include a compressor for compressing the air supplied from the inlet manifold of the motor vehicle and an air reservoir for reserving the compressed air which is to be supplied to the inflatable air bag through the first and second conduits.

Preferably, the air bag system further includes a pressure sensor installed within the first conduit for sensing an air pressure within the first conduit to generate a pressure sensing signal. The electronic control unit consistently maintains the quantity of the air preliminarily charging into the inflatable air bag and the first conduit by controlling the valve in accordance with the pressure sensing signal from the pressure sensor.

Preferably, in the above-mentioned air bag system for a motor vehicle, the first conduit is a flexible hose. The second conduit may be an air pipe and the valve may be a cut off valve. The collision sensor, the electronic control unit and the inflator may be formed as a single module.

Further, the inflator includes:

a cylindrical container including a front, rear and side wall formed as one piece;

a burstable diaphragm for partitioning an internal space of the cylindrical container into a first chamber and a second chamber;

a cylindrical filter mounted to the front wall;

a gas generating material retained in the first chamber for inflating the air bag;

a pyrotechnic material retained in the second chamber for burning the gas generating material; and pyrotechnic means mounted to the rear wall for igniting the pyrotechnic material.

Preferably, the cylindrical filter is mounted to the front wall in the concentric arrangement with the side wall. The cylindrical filter may be comprised of a metal or a ceramic. The container may be comprised of a steel or a stainless steel. The diaphragm may be a thin metal sealing diaphragm.

As described above, in the air bag system according to the present invention, a flexible hose is installed between the air bag and an inflator for enabling the preliminary charging of air into the air bag, and an air pipe is installed for connecting the flexible hose to an inlet manifold of the motor vehicle. Also, a pressure sensor is installed within the flexible hose and a cut off valve is within the air pipe. Consequently, the quantities of the pyrotechnic material and gas generating material required for inflating the air bag can be significantly reduced. Moreover, the air bag system can be equipped with the air bag of various sizes and has a cooling effect with respect to the inflation gas of high temperature and high pressure. In addition to these, the collision sensor, electronic control unit and inflator constitute a single module to be easily mounted to the motor vehicle. Furthermore, the inflator is improved by eliminating a gas flow passage but involving a single filter to significantly decrease manufacturing cost of the air bag system according to the present invention.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

Hereinbelow, a preferred embodiment of the present invention will be described in detail with reference to the accompanying drawings.

Figure 1:
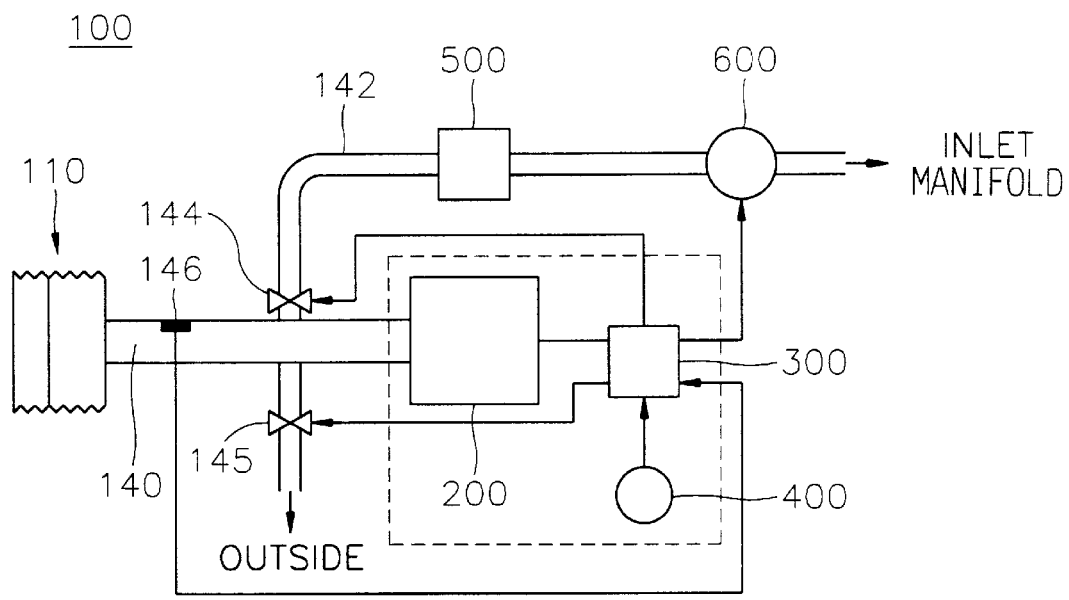
FIG. 1 is a view schematically showing a construction of an air bag system according to one preferred embodiment of the present invention.

Referring to FIG. 1, an air bag system 100 according to the preferred embodiment of the present invention includes an inflatable air bag 110, a collision sensor 400, an ECU 300 and an inflator 200. A flexible hose 140 having a predetermined length is placed between air bag 110 and inflator 200. Flexible hose 140 may comprise a rubber or resin, which is joined with an air pipe 142 around a coupling portion with inflator 200. Air pipe 142 serves as an air flow passage.

Outer end of air pipe 142 is connected to an air reservoir 500 wherein a compressed air is reserved. Air reservoir 500 is connected to an air compressor 600 which compresses air which is introduced from an inlet (intake) manifold (not shown) of a motor vehicle. Air compressor 600 is driven by the engine of the motor vehicle. Air compressor 600 sucks the air from the inlet manifold and compresses the air. The compressed air is discharged into air reservoir 500 and reserved therein.

Air pipe 142 is provided with a first cut off valve 144 on a joining portion with flexible hose 140, which adjusts an amount of the air supplied into air bag 110 via flexible hose 140 from the inlet manifold in accordance with a control signal from ECU 300. Also, air pipe 142 has a second cut off valve 145 for discharging the air in flexible hose 140 when the engine of the motor vehicle is stopped and when the air pressure in flexible hose 140 exceed the predetermined pressure range.

Meantime, a pressure sensor 146 is installed within flexible hose 140 for detecting a quantity of air preliminarily supplied into air bag 110. Pressure sensor 146 senses an air pressure within flexible hose 140, and generates a pressure sensing signal to supply it to ECU 300. When ECU 300 judges that the pressure exceeds a predetermined pressure range so that there is a possibility that inflating inflatable air bag 110 is inflated and when the collision sensing signal outputted from collision sensor 400 is not dangerous. ECU 300 sends a open control signal to a second cut off valve 145 so that second cut off valve 145 is opened. Then, the excess air in inflatable air bag 110 is vented outside the motor vehicle and thus the unnecessary inflation of inflatable air bag 110 may be avoided.

Also, when the engine of the motor vehicle is stopped. ECU 300 sends a control signal to second cut off valve 145 so that second cut off valve is opened. Then, the compressed air in inflatable air bag 110 is vented to outside of the motor vehicle. Thus, the endurance time of the air bag module may be longer.

As can be clearly noted in the drawing, air bag 110 and inflator 200 are spaced from each other by using flexible hose 140, so that inflator 200, ECU 300 and collision sensor 400 can be formed as a single module.

Figure 2:
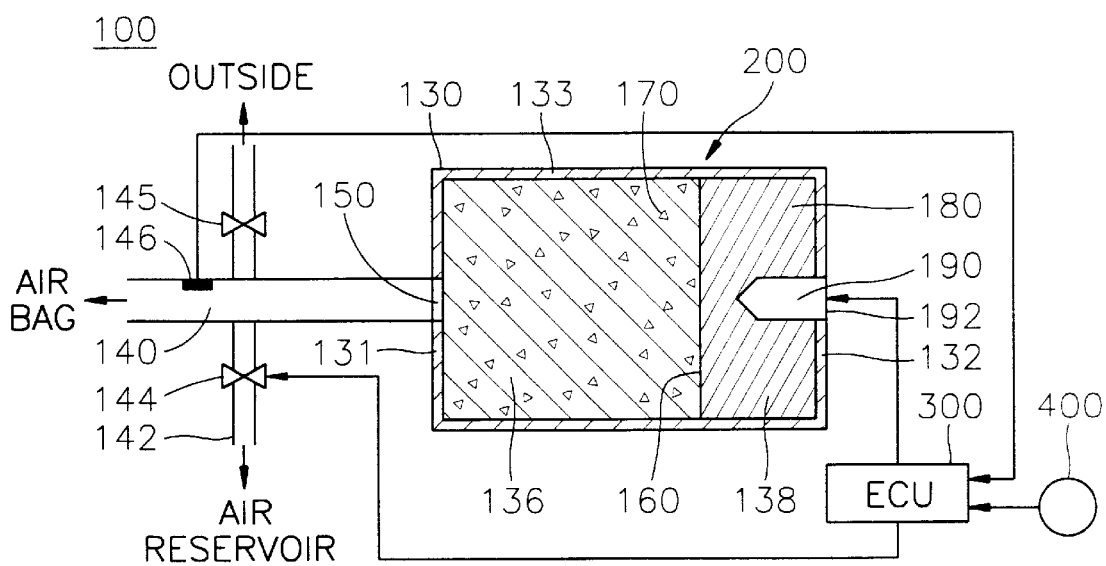
FIG. 2 is a sectional view employed to the air bag system shown in FIG. 1.
Figure 3:
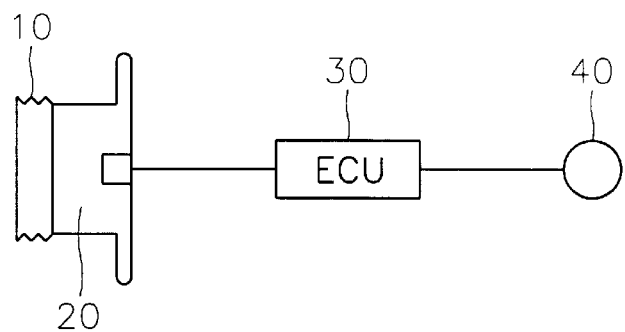
FIG. 3 is a view schematically showing a construction of a conventional air bag system.
Figure 4:
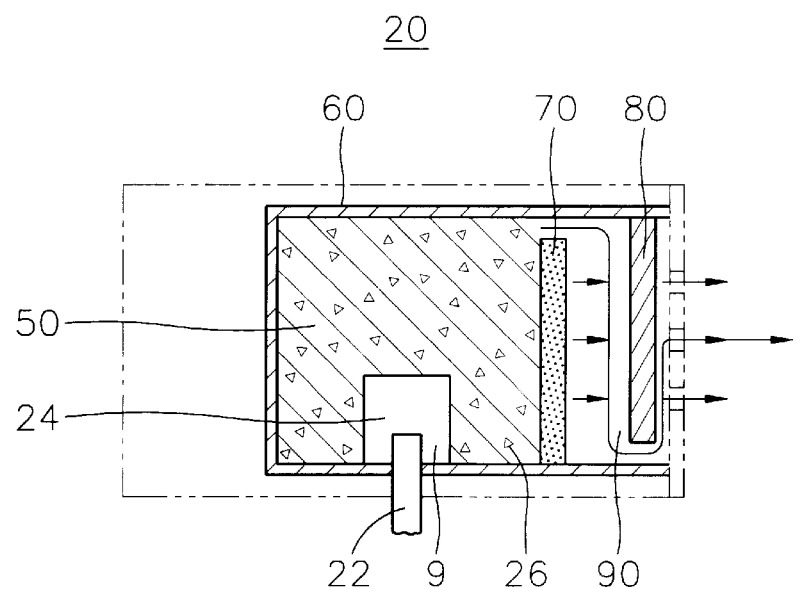
FIG. 4 is a sectional view showing the conventional inflator.

FIG. 2 illustrates a section of inflator 200 which is a major element of air bag system 100 shown in FIG. 1. Inflator 200 according to the present invention includes a sealed cylindrical container 130 which is formed of a generally cylindrical one-piece steel wall. Cylindrical container 130 may be constituted by a generally cylindrical one-piece stainless steel.

Cylindrical container 130 is incorporated with a front wall 131, a rear wall 132 and a side wall 133 formed in a body. Flexible hose 140 as shown in FIG. 1 is connected to side wall 133, which extends to inflatable air bag 110 to force air bag 110 to be communicated with cylindrical container 130. A cylindrical filter 150 consisting of a ceramic or metal is installed to front wall 131 of cylindrical container 130 connected with flexible hose 140. Cylindrical filter 150 is installed coaxially with side wall 133 of cylindrical container 130.

A burstable thin metal sealing diaphragm 160 is vertically installed in an internal space of cylindrical container 130. Thin metal sealing diaphragm 160 partitions the internal space of cylindrical container 130 into a first chamber 136 and a second chamber 138. A gas generating material 170 of pellet-like construction or disc-like construction fills in first chamber 136. A pyrotechnic material 180 fills up second chamber 138, a squib 190 inserted to the inside of second chamber 138 is loaded into rear wall 132, and pyrotechnic material 180 encloses squib 190. Pyrotechnic material 180 and gas generating material 170 are separated from each other by means of thin metal sealing diaphragm 160. An electric input terminal 192 shaped as a pin which is an outer end of squib 190 penetrates through rear wall 132 of cylindrical container 130 to outwardly extend, and is electrically connected to ECU 300.

An operation of air bag system 100 constructed as above will be described as below. If a driver starts the motor vehicle, ECU 300 senses this and sends a control signal to air compressor 600 so that air compressor 600 is operated. Air compressor 600 receives the air from inlet manifold under the atmospheric pressure or a reduced pressure and compresses the air at a higher pressure. Also, ECU 300 supplies an open signal to cut off valve 144 as soon as an engine of the vehicle begins operating.

Once cut off valve 144 is open, the air is admitted within air pipe 142 and then is introduced into air bag 110 via flexible hose 140. Inflatable air bag 110 typically has a capacity of about 60 l. Here, air bag 110 is preliminarily charged with the air of atmospheric pressure by as much as about ½ to ⅔ of the overall capacity thereof, so as not to inflate inflatable air bag 110. That is, about from 30 l to 40 l of air under the atmospheric pressure is preliminarily charged into air bag 110. Therefore, since the air bag is preliminarily charged with the air as much as being required for expanding the air bag regardless of the size of the air bag, the air bag of a variety of sizes can be employed.

Pressure sensor 146 installed within flexible hose 140 monitors the air pressure within flexible hose 140. Pressure sensor 146 generates the pressure sensing signal under the state that the air pressure within flexible hose 140 reaches a predetermined pressure value range obtained when the air preliminarily charges about ½ to ⅔ of the total capacity of air bag 110, and then provides the pressure sensing signal to ECU 300. Then, ECU 300 supplies the control signal to first cut off valve 144 to close first cut off valve 144. Also, when ECU 300 judges that the air is overly charged into inflatable air bag 110 (that is, when the air pressure within flexible hose 140 exceeds the predetermined pressure value range), ECU 300 supplies the control signal to second cut off valve 145 to open second cut off valve 145 so that the excess air in inflatable air bag 110 is vented outside. After the excess air is vented, ECU 300 judges that the air pressure sensed from pressure sensor 146 is within the predetermined pressure value range. ECU 300 supplies the close signal to second cut off valve 145 to close second cut off valve 145. By maintaining the pressure of flexible hose 140 within the predetermined pressure range, the inflation of the air bag module is prevented when the collision of the vehicle does not occur, is prevented.

By this operation, the amount of air within flexible hose 140 and air bag 110 are consistently maintained prior to operating air bag 110.

If a car body is impacted by colliding with another vehicle or object while the vehicle runs along a road, collision sensor 400 senses the collision of the motor vehicle and sends a collision signal to ECU 300. ECU 300 receives the collision signal and then judges a magnitude of the impact. That is, ECU 300 determines whether the collision sensing signal is supplied from collision sensor 400 or not to provide an air bag expansion triggering signal to inflator 200. In case that the magnitude of the impact monitored by collision sensor 400 exceeds a preset impact value, ECU 300 supplies an air bag expansion triggering signal to inflator 200 so that current is applied to electric input terminal 192 of squib 190 to heat squib 190.

Once squib 190 is heated, pyrotechnic material 180 loaded around squib 190 is ignited. Ignited pyrotechnic material 180 generates the inflation gas of high temperature and high pressure while being explosively burnt. By the inflation gas, thin metal sealing diaphragm 160 is ruptured.

Then, gas generating material 170 filling in first chamber 136 interposing thin metal sealing diaphragm 160 is ignited by the inflation gas of high temperature and high pressure. Ignited gas generating material 170 generates the gaseous combustion products of high temperature and high pressure while being explosively burnt to exhaust the combustion products to flexible hose 140. At this time, cylindrical filter 150 eliminates the specific materials as the minute particles and molten materials from the gaseous combustion products generated by the combustion of pyrotechnic material 180 and gas generating material 170 as described above.

The gas of high temperature and high pressure exhausted after eliminating the contaminating materials therefrom is provided into air bag 110 via flexible hose 140. At this time, the gas of high temperature and high pressure is cooled while passing through flexible hose 140 by the air preliminarily charging in flexible hose 140. Also, ECU 300 sends a close signal to second cut off valve 145 when the collision of the vehicle is sensed. Thus, the air in flexible hose 140 is prevented from being vented through second cut off valve 145 although the air pressure in flexible hose 140 exceed the predetermined pressure value range in case of the vehicle's collision.

Air bag 110 is completely inflated by the inflation gas of high temperature and high pressure generated by the air preliminarily charging up to about ½ through about ⅔ of the overall capacity of air bag 110 prior to the expansion thereof and the operation of inflator 200. Air bag 110 is completely inflated within 0.04 to 0.05 seconds from the moment of sensing the collision by collision sensor 400. By doing so, the passenger within the vehicle can be safely protected from the shock during the collision.

As a result, air bag system 100 according to the present invention can separate air bag 110 from inflator 200 by means of flexible hose 140, so that inflator 200, ECU 300 and collision sensor 400 are arranged to constitute the single module.

As described above, the air bag system according to the present invention preliminarily charges the clean air under the atmospheric pressure into the air bag via the inlet manifold of the vehicle and flexible hose. Thus, the quantities of the pyrotechnic material and gas generating material required for inflating the air bag can be significantly reduced, and the air bag of various sizes can be employed while affording a cooling effect with respect to the inflation gas of high temperature and high pressure.

In addition, the air bag system according to the present invention forms the elements except the air bag, i.e., the ECU, collision sensor and inflator, as the single module to facilitate the mounting of the air bag system to the motor vehicle.

Furthermore, the improved inflator having a single filter without involving the tortuous cooling passage for cooling the air bag inflation gas of high temperature is equipped to permit the air bag system according to the present invention to be cost effective in manufacturing.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An air bag system for a motor vehicle, said air bag system comprising:

an inflatable air bag;

a collision sensor for sensing a collision of the motor vehicle to generate a collision sensing signal;

an electronic control unit for receiving the collision sensing signal from said collision sensor to control an operation of said inflatable air bag, and for generating an air bag expansion triggering signal when it is judged that the collision is dangerous by receiving the collision sensing signal;

an inflator for injecting an inflation gas into said inflatable air bag in accordance with the air bag expansion triggering signal from said electronic control unit to expand said inflatable air bag;

a first conduit for preliminarily charging air into said inflatable air bag, said first conduit being connected between said inflatable air bag and said inflator;

a second conduit for introducing the air into said first conduit, said second conduit being connected to said first conduit;

an air supplying means for supplying air to said first conduit through said second conduit, said air supplying means being provided between said second conduit and an inlet manifold of the motor vehicle, the air being supplied from the inlet manifold; and a first valve provided in said second conduit for adjusting an amount of the air admitted into said inflatable air bag and said first conduit in accordance with a control signal from said electronic control unit.

2. An air bag system for a motor vehicle as claimed in claim 1, wherein said air bag system further comprises a pressure sensor installed within said first conduit for sensing an air pressure within said first conduit to generate a pressure sensing signal, and said electronic control unit consistently maintains the quantity of the air preliminarily charging into said inflatable air bag and said first conduit by controlling said first valve in accordance with the pressure sensing signal from said pressure sensor.

3. An air bag system for a motor vehicle as claimed in claim 1, wherein said inflatable air bag is preliminarily charged with the air under an atmospheric pressure in an amount of about ½ to about ⅔ of a capacity of said air bag.

4. An air bag system for a motor vehicle as claimed in claim 1, wherein said first conduit is a flexible hose.

5. An air bag system for a motor vehicle as claimed in claim 1, wherein said second conduit is an air pipe.

6. An air bag system for a motor vehicle as claimed in claim 1, wherein said valve is a cut off valve.

7. An air bag system for a motor vehicle as claimed in claim 1, wherein said collision sensor, said electronic control unit and said inflator are formed as a single module.

8. An air bag system for a motor vehicle as claimed in claim 1, further comprising a second valve for discharging the air in the inflatable air bag when an engine of the motor vehicle is stopped.

9. An air bag system for a motor vehicle as claimed in claim 1, wherein said air supplying means includes a compressor for compressing the air supplied from the inlet manifold of the motor vehicle and an air reservoir for reserving the compressed air which is to be supplied to said inflatable air bag through said first and second conduits.

10. An air bag system for a motor vehicle as claimed in claim 1, wherein said inflator comprises:

a cylindrical container including a front, rear and side wall formed as one piece;

a burstable diaphragm for partitioning an internal space of said cylindrical container into a first chamber and a second chamber;

a cylindrical filter mounted to said front wall;

a gas generating material retained in said first chamber for inflating said air bag;

a pyrotechnic material retained in said second chamber for burning said gas generating material; and pyrotechnic means mounted to said rear wall for igniting said pyrotechnic material.

11. An air bag system for a motor vehicle as claimed in claim 10, wherein said cylindrical filter is mounted to said front wall in concentric arrangement with said side wall.

12. An air bag system for a motor vehicle as claimed in claim 10, wherein said container is comprised of a steel or a stainless steel.

13. An air bag system for a motor vehicle as claimed in claim 10, wherein said diaphragm is a thin metal sealing diaphragm.

14. An air bag system for a motor vehicle as claimed in claim 10, wherein said cylindrical filter is comprised of a metal or a ceramic.

15. An air bag system for a motor vehicle, said air bag system comprising:

an inflatable air bag;

a collision sensor for sensing a collision of the motor vehicle to generate a collision sensing signal;

an electronic control unit for receiving the collision sensing signal from said collision sensor to control an operation of said inflatable air bag, and for generating an air bag expansion triggering signal when it is judged that the collision is dangerous by receiving the collision sensing signal;

an inflator for injecting an inflation gas into said inflatable air bag in accordance with the air bag expansion triggering signal from said electronic control unit to expand said inflatable air bag, said inflator including a cylindrical container having a front, rear and side wall formed as one piece, a burstable thin metal sealing diaphragm for partitioning an internal space of said cylindrical container into a first chamber and a second chamber, a cylindrical filter mounted to the front wall, a gas generating material retained in said first chamber for inflating said air bag, a pyrotechnic material retained in said second chamber for burning the gas generating material and a pyrotechnic means mounted to the rear wall for igniting the pyrotechnic material;

a flexible hose for preliminarily charging air into said inflatable air bag, said flexible hose being connected between said inflatable air bag and said inflator;

an air pipe for introducing the air into said flexible hose, said air pipe being connected to said flexible hose;

an air supplying means for supplying air to said flexible hose through said air pipe, said air supplying means being provided between said air pipe and an inlet manifold of the motor vehicle, the air being supplied from the inlet manifold;

a cut off valve provided to said air pipe for adjusting an amount of the air admitted into said inflatable air bag and said flexible hose in accordance with a control signal from said electronic control unit; and a pressure sensor installed within said flexible hose for sensing an air pressure within said flexible hose to generate a pressure sensing signal, wherein said inflatable air bag is preliminarily charged with the air under an atmospheric pressure in an amount of about ½ to about ⅔ of a capacity of said air bag, said electronic control unit consistently maintains the quantity of the air preliminarily charging into said inflatable air bag and said flexible hose by controlling said cut off valve in accordance with the pressure sensing signal from said pressure sensor, and said collision sensor, said electronic control unit and said inflator are formed as a single module.

16. An air bag system for a motor vehicle as claimed in claim 15, said container is comprised of a steel or a stainless steel.

17. An air bag system for a motor vehicle as claimed in claim 15, wherein said cylindrical filter is comprised of a metal or a ceramic.

18. An air bag system for a motor vehicle, said air bag system comprising:

an inflatable air bag;

a collision sensor for sensing the collision of the motor vehicle to generate a collision sensing signal;

an electronic control unit for receiving the collision sensing signal from said collision sensor to control an operation of said inflatable air bag, and for generating an air bag expansion triggering signal when it is judged that the collision is dangerous by receiving the collision sensing signal;

an inflator for injecting an inflation gas into said inflatable air bag in accordance with an air bag expansion triggering signal from said electronic control unit to expand said inflatable air bag, said inflator including a cylindrical container being comprised of either a steel or a stainless steel, and having a front, rear and side wall formed as one piece, a burstable thin metal sealing diaphragm for partitioning an internal space of said cylindrical container into a first chamber and a second chamber, a cylindrical filter comprised of either a metal or a ceramic, and mounted to the front wall, a gas generating material retained in said first chamber for inflating said air bag, a pyrotechnic material retained in said second chamber for burning the gas generating material and a pyrotechnic means mounted to the rear wall for igniting the pyrotechnic material;

a flexible hose connected between said inflatable air bag and said inflator for preliminarily charging air into said inflatable air bag;

an air pipe connected between an inlet manifold of the motor vehicle and said flexible hose for introducing the air into said flexible hose;

an air supplying means for supplying air to said flexible hose through said air pipe, said air supplying means being provided between said air pipe and the inlet manifold of the motor vehicle, the air being supplied from the inlet manifold;

a cut off valve provided in said air pipe for adjusting an amount of the air admitted into said inflatable air bag and said flexible hose in accordance with a control signal from said electronic control unit; and a pressure sensor installed within said flexible hose for sensing an air pressure within said flexible hose to generate a pressure sensing signal, wherein said inflatable air bag is preliminarily charged with the air under an atmospheric pressure of about ½ through ⅔ of a capacity of said air bag, said electronic control unit consistently maintains the quantity of the air preliminarily charging into said inflatable air bag and said flexible hose by controlling said cut off valve in accordance with the pressure sensing signal from said pressure senor, and said collision sensor, said electronic control unit and said inflator are formed as a single module.

* * * * *